United States Patent [19]
Allen et al.

[11] 3,715,337
[45] Feb. 6, 1973

[54] PREPARATION OF POLY(ISOCYANURATE-URETHANES) USING TRITHIOCARBONATES AS CATALYSTS

[75] Inventors: Michael George Allen, Hudson, Wis.; George Van Dyke Tiers, St. Paul, Minn.

[73] Assignee: Minnesota Mining and Manufacturing Company, St. Paul, Minn.

[22] Filed: June 1, 1971

[21] Appl. No.: 148,938

[52] U.S. Cl. ......260/77.5 NC, 117/161 KP, 252/192, 260/2.5 AW, 260/33.2, 260/33.4, 260/37, 260/77.5 AB, 260/77.5 AC, 260/858
[51] Int. Cl...................C08g 22/40, C07c 154/00
[58] Field of Search....260/77.5 NC, 455 B, 77.5 AB, 260/77.5 A C; 252/192

[56] References Cited

UNITED STATES PATENTS

| | | | |
|---|---|---|---|
| 3,607,865 | 9/1971 | Dyer et al. | 260/234 |
| 2,844,584 | 7/1958 | Guendel et al. | 260/293.4 |
| 3,179,626 | 4/1965 | Beitchman | 260/77.5 |
| 3,324,134 | 6/1967 | Wakeman et al. | 260/286 |
| 3,381,008 | 4/1968 | Steyermark | 260/248 |

OTHER PUBLICATIONS

Sjenko et al., "Chemistry," 2nd Ed., McGraw–Hill, New York (1961), pages 315, 515.
Streitweiser, Solvolytic Displacement Reactions, Mc-Graw-Hill, New York, (1962), pages 9–10.
Wertheim, Organic Chemistry, 2nd Ed. Balkiston, N.Y., (1945) page 324.

*Primary Examiner*—Donald E. Czaja
*Assistant Examiner*—H. S. Cockeran
*Attorney*—Kinney, Alexander, Sell, Steldt & Delahunt

[57] ABSTRACT

Polyisocyanates are trimerized, polymerized, or reacted with polyols in the presence of a trithiocarbonate salt catalyst, such as sodium ethyltrithiocarbonate, to produce polyisocyanurates, or poly(isocyanurate-urethanes).

9 Claims, No Drawings

PREPARATION OF POLY(ISOCYANURATE-URETHANES) USING TRITHIOCARBONATES AS CATALYSTS

BACKGROUND OF THE INVENTION

This invention relates to polyisocyanurates. In another aspect, it relates to a process for making polyisocyanurates using catalysts. In a further aspect, it relates to isocyanate-derived crosslinked polymers containing isocyanurate and urethane linkages, and the preparation of such polymers using certain salt catalysts. In a still further aspect, it relates to novel trithiocarbonate salts and their preparation.

The trimerization of aliphatic or aromatic polyisocyanates, e.g. tolylene diisocyanate, to produce isocyanurates is known. A host of trimerization catalyst have been disclosed, e.g., see "Polyurethanes: Chemistry and Technology," Part 1, by J. H. Saunders and K. C. Frisch, Interscience Pub., New York (1962), p. 94, and U.S. Pat. Nos. 2,965,614, 2,979,485, 2,993,870, 3,168,483, 3,179,626, 3,206,352, 3,211,704, 3,280,066, and 3,381,008, the latter disclosing certain xanthate catalysts.

Though many of the catalysts disclosed as useful in the above-described prior art processes have merit, many of them have undesirable features. Heavy metal catalysts are often toxic or leave residues in the products resulting from their use. Other catalysts are corrosive and hazardous to use. Many are not active at room temperature or have limited solubility in the reaction mixtures. Some are so active that the catalyst cannot be homogeneously dispersed in the reactants before localized curing occurs. Some catalysts are not applicable in the formation of foamed products.

SUMMARY OF THE INVENTION

Briefly, according to this invention, polyisocyanates are trimerized to yield useful polyisocyanurates by carrying out the trimerization in the presence of trithiocarbonate salt catalysts (or promoters). These catalysts preferably have the general formula

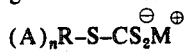

$$(A)_n R-S-\overset{\ominus}{C}S_2\overset{\oplus}{M}$$

where A is a hydroxy group, mercapto group, or a hydrogen atom, R is a polyvalent saturated straight or branched aliphatic group, (which can have one or more catenary ether oxygen atoms or thioether sulfur atoms) such as alkylene, alkyleneoxyalkylene, or poly(alkyleneoxyalkylene), each said alkylene moieties being straight or branched chain and having, for example, two to 18 carbon atoms, $n$ is an integer equal to $p-1$, where $p$ is the valence of said polyvalent saturated aliphatic group, $n$ preferably being 1 to 3, and M is a salt-forming cation, such as an alkali metal cation, e.g. sodium, potassium, or lithium, or a quaternary ammonium cation, e.g. tetraalkylammonium (the alkyl groups of which can have, for example, one to 18 carbon atoms each). The polyisocyanates can be trimerized per se in the presence of the trithiocarbonate salts to produce polyisocyanurates, or polyisocyanates in admixture with polyols can be polymerized in the presence of the salts (the latter preferably being added to the admixture in the form of a polyol solution) to produce poly(isocyanurate-urethanes). The salts mixed with the polyols are preferred because such solutions are generally more convenient to handle and use than are powders.

The trithiocarbonate salts, and polyol solutions thereof, used in this invention are relatively storage stable. The polyisocyanate or polyisocyanate-polyol mixtures mixed with such salts or polyol solutions thereof are reaction mixtures having a desirable pot-life at ambient temperature, e.g., 30° to 100° F. As such, the reaction mixtures are latently curable and can be readily applied, e.g. as a coating, or shaped and the applied or shaped reaction mixture then allowed to slowly cure at ambient temperatures, or alternatively moderately heated, e.g. from ambient temperature to 200° F., to effect rapid cure. The gel times of such reaction mixtures are relatively independent of the bulk of the reaction mixture and high catalyst levels can be used to get a "-tight" or complete cure. Further, the gel times do not depend strongly upon close control of catalyst concentration, thus permitting use of the catalyst without requiring accurate measurement of its concentration.

The above-described trithiocarbonate salts can be prepared by following known procedures, e.g., see E. Wertheim, Journal of the American Chemical Society, Vol. 48, page 826 (1926). A particularly useful procedure for making the trithiocarbonate salts of this invention comprises, as a first step, reacting a precursor mercaptan, such as dodecylmercaptan, with a source of strong base such as alkali metal, or hydroxide or alcholate thereof, e.g. sodium, sodium hydroxide, or sodium methoxide, to prepare the corresponding salt of the mercaptan. The salt is then reacted, in a second step, with an amount of carbon disulfide equivalent to the amount of base, or in excess thereof, to prepare the trithiocarbonate salt having the above-described formula. Preferably, in the first step, the source of base is reacted with a stoichiometric amount of the mercaptan dissolved in a polyol so as to produce a polyol solution of the mercaptan salt, and this solution then, in the second step, is reacted with carbon disulfide to produce the trithiocarbonate salt in solution. The solutions can have low concentrations of the trithiocarbonate salt, e.g. as low as 0.01 molal, though concentrations of greater than 0.03 molal are preferred when polyisocyanates having significant inherent acidity are used in this invention. Use of the trithiocarbonate salt catalyst in the form of such a solution enables one to intimately and rapidly admix the catalyst with the polyisocyanate as well as with any polyol that may be present in admixture therewith. The polyol solvent in such solutions is, of course, a reactive solvent for the polyisocyanate as well and reacts therewith to form urethane linkages. It should be understood, however, that use of the trithiocarbonate salt in the form of a polyol solution is not essential to the practice of this invention, though such solutions are preferred for reasons given above.

Trithiocarbonate salt catalysts can also be prepared by reacting an alkoxide with a precursor mercaptan to form a mercaptan salt, followed by reaction of the latter with carbon disulfide to form the desired trithiocarbonate salt.

The preferred trithiocarbonate salt catalysts have one or more mercapto or hydroxyl groups in their structure; as such, in addition to promoting the trimerization of the isocyanate groups, they have the added advantage in that the mercapto or hydroxyl group reacts with the polyisocyanate component, forming thiourethane or urethane linkages, the catalyst thus becoming an integral part of the resulting polymer product. As such, the catalyst will not exude from the polymer, and the cured polymer therefore resists shrinkage or weight loss (even when heated under vacuum).

The polyisocyanates which can be polytrimerized with the trithiocarbonate salts of this invention are well-known and include those used heretofore to form polyurethanes. Particularly useful polyisocyanate compounds which can be used in this invention are the polyisocyanate compounds, which can be represented by the formula $R(NCO)_n$ where R is arylene or alkarylene and $n$ is 2 to 5 higher, such as 2,4- and 2,6-tolylene diisocyanates; 1,5-naphthylene diisocyanates; 4,4'-diisocyanatophenylmethane; 3,3'-dimethyl-4,4'-biphenylene diisocyanate; 3,3'-dimethoxy-4,4' bisphenylene diisocyanate; 3,3'-diphenyl-4,4'-biphenylene diisocyanate; 4,4'-biphenylene diisocyanate; 3,3-dichloro-4,4'-biphenylene diisocyanate; and 4,4',4''-triisocyanatotriphenylmethane. The so-called polymeric polyisocyanates can also be used, such as those obtained by phosgenation of polyamides prepared by condensing formaldehyde with aromatic amines. Particularly useful polymeric polyisocyanates are the polymethylene polyphenyl isocyanates, such as those sold commercially under the trademarks of Mondur MR and MRS, Isonate 901 and 390F, and PAPI. A list of useful commercially available polyisocyanates is found in "Encyclopedia of Chemical Technology", Othmer, 2nd Ed., p. 146–147, Interscience Pub., 1967 and in Appendix A of "Polyurethanes: Chemistry and Technology," by Saunders and Frisch, Part I, Interscience Pub. (New York, 1962). Urethane prepolymers, sometimes referred to as isocyanate-terminated prepolymers, also can be used and are known (e.g. see U.S. Pat. Nos. 3,073,802 and 3,054,755), such prepolymers being prepared by reacting aromatic or so-called polymeric polyisocyanates with a polyol such as polyoxyalkylene polyol, typically, polypropylene glycol, using an excess of the polyisocyanate. Mixtures of various polyisocyanates can be used to prepare the polymers of this invention. The polyisocyanates which are preferred are those commonly used in conjunction with polyols to prepare polyurethanes, including so-called urethane prepolymers.

Where the polyisocyanurate is prepared by polytrimerizing polyisocyanate in the presence of polyol, conventional polyols used in making polyurethanes can be used. Such polyols include polyalkylene ether polyols and polyesters and polyester amides containing plural reactive hydroxyl groups. The polyols can have varying molecular weights, for example, between 90 and 5,000 or even higher, the preferred polyols having a molecular weight of 400 to 5,000. Where a harder polyisocyanurate is desired, the polyol will generally have a hydroxyl equivalent weight of 45 to 400 (i.e. one reactive hydroxyl group per 45 to 400 molecular weight of polyol). Where a softer, more rubbery polyisocyanurate is desired, the polyol will generally have an equivalent weight of 400 to 1,000, or higher. The polyalkylene ether polyols are generally condensates of ethylene, propylene, or butylene oxides with glycerol, pentaerythritol, sorbitol, sucrose, methylglucosides, or low molecular polyols, such as propylene glycol, tri-, tetra-, penta-, hexa-methylene glycols, 1,3-butylene glycol, 1,3-(2 ethyl) hexane diol, 2,2,4-trimethyl-1,3-pentane-diol, trimethylol propane, 1,2,6-hexane triol, or phenyldiisopropanolamine. Polypropylene ether polyols are particularly useful and readily commercially available (see Appendix B of Saunders & Frisch, supra). The preferred polyols are polypropylene ether glycols (or triols), and mixtures thereof having a molecular weight of 500 to 3,000. It will be noted that the polyols described above can also be used as the polyol in preparing the polyol-catalyst solutions described earlier.

Where the polyisocyanurate of this invention is made from polyisocyanate-polyol reaction mixtures, the mixtures can have NCO/OH equivalent ratios greater than 1, preferably at least about 1.2/1, and can be as high as 12/1 or greater, e.g., as much as 40/1. Typically, the NCO/OH ratio will be 1.2/1 to 6/1. Generally, the greater this ratio, the greater amount of isocyanurate linkage in the resulting product and the greater its hardness. The preferred products are those which are highly crosslinked by reason of having about 10 to 95 percent of the isocyanate groups in the reaction mixture converted to isocyanurate linkages, the rest of the isocyanate-derived linkages comprising urethane linkages or, in the event that moisture is present during polymerization, urea linkages.

Where a more highly crosslinked polymer is desired, a polyol-diisocyanate reaction mixture can include a conventional triisocyanate or a triol. The reaction mixture can also include modifying mono-isocyanates, or alcohols such as 1,4-butane diol, butyl Cellosolve, butyl Carbitol, and oleyl alcohol, to impart special properties to the polymer product, such as the degree of final hardness.

The polytrimerization of the polyisocyanate reactant can be carried out with an amount of the trithiocarbonate salt sufficient to promote polytrimerization. Generally, this amount will be at least a catalytic amount, e.g. up to 10 weight percent of the weight of the polyisocyanate and preferably 0.5 to 5 weight percent of the weight of the polyisocyanate.

Filled polymer products can be made by incorporating into the reaction mixtures a host of different powdered, granular, fibrous, or finely divided fillers (e.g. 5 to 95 weight percent of the reaction mixture) such as clay, talc, rubbery granular aggregate such as vulcanized rubber obtained as scrap from automobile or truck tires, titanium dioxide, diatomaceous earth, glass microbubbles, and the like. Hollow glass spheroids or microbubbles are useful as fillers in making lightweight polyisocyanurate cellular articles. Co-reactant materials, such as the diamines described in U.S. Pat. No. 3,248,454 can be included in the polyolpolyisocyanate reaction mixture, e.g., to increase the viscosity or moldability thereof as well as to increase the hardness of the resulting product. Fire retardant fillers, such as polyvinyl chloride and antimony or phosphorus compounds can also be incorporated into the reaction mixture. Foamed or porous polyisocyanurate products of this invention can be made by incorporating a small amount of water and/or by blowing the reaction mixture with a low molecular weight halocarbon blowing agent such as those disclosed in U.S. Pat. No.

3,072,582. Conventional foam stabilizing agents such as silicone oils or organosilicones can also be incorporated into such reaction mixtures to obtain foamed products with controlled porosity. Another useful foam stabilizer that can be used is a perfluoroalkylamine, such as that disclosed in U.S. Pat. No. 3,378,399. Co-catalysts which can be used in conjunction with the trithiocarbonate salt catalysts of this invention include polyol soluble organic compounds and certain compounds of polyvalent metals, such as tin, lead, or mercury (see Brit. Pat. No. 1,053,383). Examples of such co-catalysts are phenylmercuric acetate, phenylmercuric oleate, mercuric octoate, mercuric naphthenate, lead octoate, lead naphthenate, dibutyl tin dilaurate, dibutyl tin diacetate, and similar compounds.

The polyisocyanurate polymer made in accordance with this invention is a crosslinked polymer characterized by containing a plurality of isocyanurate linkages which impart thermal stability to the polymer. Each such linkage, resulting from the trimerization of three isocyanate moieties, —NCO, have the formula

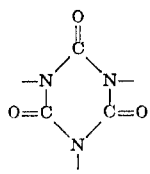

The trithiocarbonate salts used in this invention catalyze, promote or accelerate the formation of such isocyanurate linkages and, where polyol is present during trimerization, the trithiocarbonate salts also promote the concurrent formation of urethane linkages. By polytrimerizing isocyanate prepolymers based on polyols, the polyisocyanurates will also have urethane linkages which are inherently present in the isocyanate prepolymers. Thus, the term "polyisocyanurate" as used herein generically denotes a polymer having a plurality of isocyanurate linkages as well as a polymer having a plurality of both isocyanurate linkages and urethane linkages unless indicated otherwise. These polyisocyanurates can have crosslink densities of 1 crosslink per 400 to 20,000 atomic weight units of polymer, the preferred rubbery polyisocyanurates having a crosslink density of 1 crosslink per 1,000 to 5,000 atomic weight units.

In addition to the aforementioned thermal stability, these polymers are hydrolytically stable and no significant change in physical properties, such as hardness, occurs in these polymers on standing or in use, even upon immersion in water on upon being subjected to high humidity and high temperature environments (e.g. when tested by the procedure described in "Insulation," August, 1968, p. 39).

The polyisocyanurates of this invention can be used as binders for various fillers, such as vulcanized rubber aggregate, to provide paving surface, particularly such as those tracks or fields used for athletic or sporting purposes, and as coatings to provide protective surfaces, for example as rain-proof or water-resistant coating for clothing. They can be used as laminating or preimpregnating resins for sheets of glass fiber and as adhesives for bonding metal to metal, wood to wood, and metal to wood, and as potting compositions for insulating magnet coils or other electrical devices. They also can be used as tooling resins and to form shaped articles such as electrical connectors. The superior hydrolytic stability of the polyisocyanurate products of this invention means that they are useful when shaped in the form of articles that are subject to moisture contact during use or which come into contact with aqueous solvents or water, such as gaskets, seals, etc.

Further objects and advantages of this invention will be illustrated in the following examples, though particular materials and amounts thereof recited in these examples, as well as other details, should not be construed to unduly limit this invention. In these examples, the parts recited are parts by weight.

EXAMPLE 1

Sodium trithiocarbonate catalysts were prepared by the following procedure.

Into a 100 ml., 3-neck flask equipped with a thermometer, dropping funnel, condenser, and stirrer was mixed and reacted 30.3 grams n-dodecylmercaptan, 40 ml. toluene, and 2.3 g. of particulate sodium metal. The resulting mixture was heated to 100° C. and held at that temperature for 15 min., producing a white solid in the reaction mixture. The mixture was cooled to 25° C. whereupon was added a solution of 8.0 g. carbon disulfide in about 10 ml. toluene, and the reaction mixture was stirred overnight. The resulting reaction mixture was filtered to remove sodium dodecyltrithiocarbonate as a yellow waxy solid, in the amount of about 25 g., after washing the solid with toluene.

The procedure described above can be followed by using other mercaptan precursors to prepare other trithiocarbonate catalysts, as illustrated in Table I below:

TABLE I

| Mercaptan Precursor | Catalyst |
| --- | --- |
| ethyl mercaptan | sodium ethyltrithiocarbonate |
| butylmercaptan | sodium butyltrithiocarbonate |
| n-octadecylmercaptan | sodium n-octadecyltrithiocarvonate |
| penylmercaptan | sodium phenyltrithiocarbonate |

EXAMPLE 2

A polyol solution of a trithiocarbonate salt catalyst was prepared as follows:

In a 100 ml. flask fitted with a stirrer, thermometer, and condenser was mixed 70 g. dipropylene glycol and 2.3 g. particulate sodium metal, resulting in evolution of hydrogen. After the hydrogen evolution had subsided, 20.2 g. n-dodecylmercaptan was added with stirring for 15 min., and thereafter 7.6 g. carbon disulfide was added with additional mixing, causing the solution to be transformed into a deep yellow color, and producing a slight exotherm which was maintained below 50° C. The resulting solution contained 20 percent by weight sodium n-dode-cyltrithiocarbonate in dipropylene glycol.

EXAMPLE 3

Into each of two vials marked C and D was placed 10.0 g. polymethylene polyphenylisocyanate (Mondur MRS) and 0.2 g. of the catalyst solution containing 20 percent sodium trithiocarbonate as prepared in Example 2. After mixing vial C was placed in an air oven at 100° C. and vial D was allowed to stand at room temperature. In less than 8 min. the contents of vial C had cured to produce a hard polyisocyanurate product. After 1½ hrs. the contents of vial D became very viscous, and after 24 hrs., very hard, producing a polyisocyanurate product.

EXAMPLE 4

There was added to 100 g. of an isocyanate-terminated prepolymer (prepared from 26 parts of a polypropylene glycol having a molecular weight of 2,000, 23.75 parts of tripropylene glycol, and 155 parts of 4,4'-diphenylmethane diisocyanate) and 1.25 g. of a 20 percent solution of sodium dodecyltrithiocarbonate prepared as in Example 2, to produce a polyisocyanurate coating composition which was slowly increasing in viscosity but which while still fluid could be spread as a thin coating. The coating composition was used to impregnate 4 pieces of 6" ×8" glass fiber cloth (Style 181) that had been sized with 1-aminopropyltriethyoxysilane (A-100). The impregnated cloth was assembled into a 4-ply laminate and placed between 2 sheets of aluminum plate that had been treated with a mold release agent. The assembly was placed into a press preheated to 120° C. and held at contact pressure for 30 sec. The pressure was then increased to 160 psi and the system held at 120° C. and 160 psi for 20 min. At the end of this time, the pressure was released and the laminate allowed to cool. It was found to contain 25 to 32 percent by weight of resin, the remainder being glass cloth. The laminate was rigid, very strong and useful as structural material or as a printed circuit board.

EXAMPLE 5

Into each of three vials, marked E, F, and G was placed 15 parts polypropyleneethertriol having a molecular weight of 3,000 (Niax LG-56) and the amounts shown below of sodium dodecyltrithiocarbonate catalyst solution as described in Example 2. The resulting polyol-catalyst solutions were each mixed with 15 parts polymethylene polyphenyl polyisocyanate having an equivalent weight of 135. The mixtures were stirred and allowed to cure at about 25° C. to a polyisocyanurate. Gel times, determined by measuring the time required until each mixture developed a solid core as determined by prodding with a rod, are shown below.

| Vial | Amt. Catalyst (parts) | Get Time |
|------|----------------------|----------|
| E | 0.42 | 19 min. |
| F | 0.56 | 13.9 min. |
| G | 0.70 | 11.5 min. |

The above data shows that the curing of polypropyleneether triol polyisocyanate mixture proceeds smoothly and that the gel time will vary moderately as a function of the catalyst concentration providing a means of controlling the pot-life of the isocyanurate modified polyurethanes without affecting their properties.

Various modifications and alterations of this invention will become apparent to those skilled in the art without departing from the scope and spirit of the invention.

What is claimed is:
1. A method of making poly(osocyanurate-urethanes) comprising mixing polyisocyanate with polyol in the presence of an effective amount of a trithiocarbonate salt polymerization catalyst having the formula $(A)_n\text{-R-S-CS}_2^{\ominus}M^{\oplus}$ wherein A is hydroxyl, mercapto or hydrogen, R is a polyvalent saturated aliphatic group, n is an integer equal to p-1, where p is the valence of R, and M is an alkali metal cation or a quaternary ammonium cation wherein the alkyl groups have from 1 to 18 carbon atoms each, each polyol being selected from the group consisting of polyalkylene ether polyols and polyesters and polyester amides containing plural reactive hydroxyl groups.

2. The method of claim 1 wherein R is alkyleneoxyalkylene or poly(alkyleneoxy)-alkylene, and $M^{\oplus}$ is an alkali metal cation.

3. The method of claim 1 wherein R is propyleneoxypropylene and $\overset{\oplus}{M}$ is sodium or potassium cation.

4. The method of claim 1 wherein said trithiocarbonate salt is used as a solution in polypropylene-ether-glycol or -triol.

5. The method of claim 1 wherein said trithiocarbonate salt is sodium ethylthiocarbonate.

6. The method of claim 1 wherein said trithiocarbonate salt is sodium dodecylthiocarbonate.

7. The method of claim 1 wherein said polyol is dipropylene glycol, polypropylene ether glycol, or polypropylene ether triol.

8. A solution of 0.1-20 weight percent of the trithiocarbonate salt defined in claim 1 in a polyol selected from the group consisting of polyalkylene ether polyols and polyesters and polyester amides containing plural reactive hydroxyl groups.

9. The solution of claim 8 wherein said polyol is dipropylene glycol, polypropylene ether glycol, or polypropylene ether triol.

* * * * *

UNITED STATES PATENT OFFICE
CERTIFICATE OF CORRECTION

Patent No. 3,715,337     Dated February 6, 1973

Inventor(s) Michael G. Allen and George Van Dyke Tiers

It is certified that error appears in the above-identified patent and that said Letters Patent are hereby corrected as shown below:

Col. 5, line 53 "on" should be "or"

Col. 7, line 49 "Get Time" should be "Gel Time"

Claim 1, line 1 "poly(osocyanurate-" should be "poly(isocyanurate-"

Col. 8, line 19 "M" should be "M$^{\oplus}$"

Claim 2 - "(A) RSCS$_o$M$^{\ominus\oplus}$" should be deleted.

Signed and sealed this 3rd day of July 1973.

(SEAL)
Attest:

EDWARD M. FLETCHER, JR.      Rene Tegtmeyer
Attesting Officer            Acting Commissioner of Patents